United States Patent
Lu et al.

(10) Patent No.: US 11,005,381 B2
(45) Date of Patent: May 11, 2021

(54) SYNCHRONOUS RECTIFIER CONTROL CIRCUIT

(71) Applicant: TEXAS INSTRUMENTS INCORPORATED, Dallas, TX (US)

(72) Inventors: Bing Lu, Bedford, NH (US); Bharath Kannan, Merrimack, NH (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 42 days.

(21) Appl. No.: 16/448,024

(22) Filed: Jun. 21, 2019

(65) Prior Publication Data

US 2020/0052603 A1    Feb. 13, 2020

Related U.S. Application Data

(60) Provisional application No. 62/715,553, filed on Aug. 7, 2018.

(51) Int. Cl.
| | | |
|---|---|---|
| *H02M 3/335* | (2006.01) | |
| *H02M 3/337* | (2006.01) | |
| *H02M 1/00* | (2006.01) | |

(52) U.S. Cl.
CPC ..... *H02M 3/33592* (2013.01); *H02M 3/3376* (2013.01); *H02M 2001/0003* (2013.01); *H02M 2001/0035* (2013.01); *H02M 2001/0058* (2013.01)

(58) Field of Classification Search
CPC ......... H02M 3/33592; H02M 3/33576; H02M 3/3376; H02M 2001/0058; H02M 2001/0035; H02M 2001/0003; H02M 3/335; Y02B 70/10; H03K 17/063; H03K 17/691; H03K 2217/0081

See application file for complete search history.

(56) References Cited

U.S. PATENT DOCUMENTS

| | | | | |
|---|---|---|---|---|
| 6,870,747 B2* | 3/2005 | Bridge | ............. | H02M 3/33592 363/21.06 |
| 2009/0040792 A1* | 2/2009 | Yang | ................. | H02M 3/33592 363/21.06 |
| 2014/0376272 A1* | 12/2014 | Miao | ................. | H02M 3/33592 363/21.02 |
| 2016/0190942 A1* | 6/2016 | Kikuchi | ............ | H02M 3/33576 363/21.14 |
| 2018/0131286 A1* | 5/2018 | Song | ................. | H02M 3/33592 |
| 2019/0229634 A1* | 7/2019 | Moon | ..................... | H02M 1/08 |
| 2019/0267906 A1* | 8/2019 | Zhang | ............... | H02M 3/33592 |
| 2020/0106366 A1* | 4/2020 | Miletic | ............... | H02M 3/3376 |

OTHER PUBLICATIONS

U.S. Appl. No. 62/683,120, "Synchronous Rectifier Control," filed May 30, 2019, 39 pages.

* cited by examiner

*Primary Examiner* — Thienvu V Tran
*Assistant Examiner* — Shahzeb K Ahmad
(74) *Attorney, Agent, or Firm* — Mark Allen Valetti; Charles A. Brill; Frank D. Cimino

(57) ABSTRACT

A synchronous rectifier control circuit includes a drain voltage input, a first gate voltage output, a second gate voltage output, a gate voltage generation circuit, and a trigger control circuit. The gate voltage generation circuit includes a first input coupled to the drain voltage input, and an output coupled to the first gate voltage output. The trigger control circuit includes a first input coupled to the first gate voltage output, a second input coupled to the second gate voltage output, and an output coupled to a second input of the gate voltage generation circuit.

17 Claims, 8 Drawing Sheets

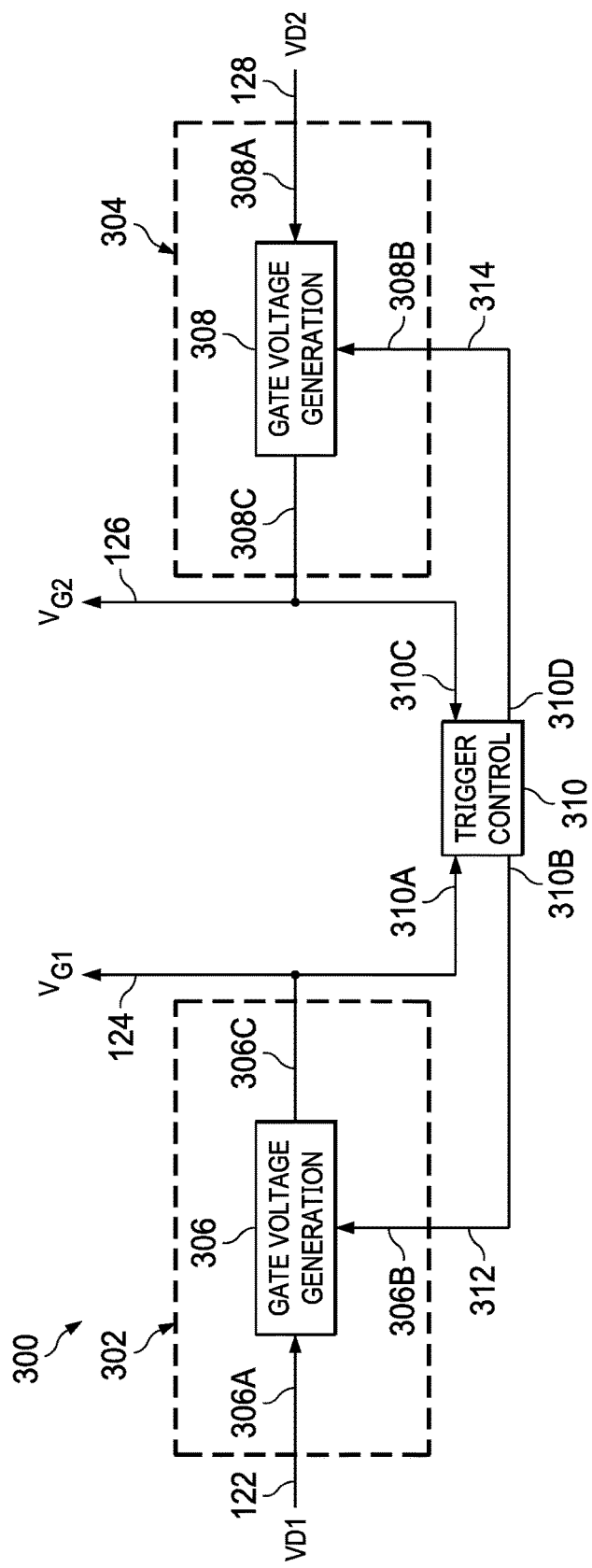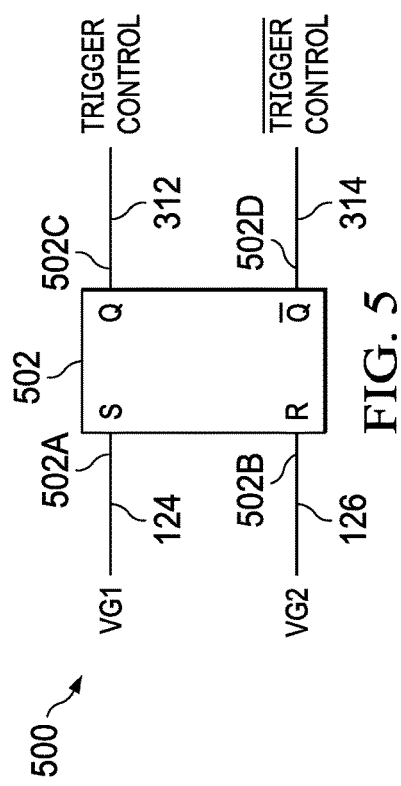
FIG. 3
FIG. 5

SYNCHRONOUS RECTIFIER CONTROL CIRCUIT

CROSS-REFERENCE TO RELATED APPLICATIONS

The present application claims priority to U.S. Provisional Patent Application No. 62/715,553, filed Aug. 7, 2018, entitled "Robust Blanking Time for LLC SR Control in Burst Mode," which is hereby incorporated herein by reference in its entirety.

BACKGROUND

A DC/DC converter is a switching power supply that accepts a DC input voltage and generates a DC output voltage that is typically different from the DC input voltage. DC/DC converters include a switching transistor that is turned on and off to charge and discharge an inductor. Switching losses in the transistor may be reduced by coupling a resonant inductor-capacitor circuit to the switching transistor to produce sinusoidal rather than square-wave current waveforms. Such DC/DC converters are referred to as resonant DC/DC converters.

LLC resonant converters, which include a resonant circuit using two inductors and a capacitor, provide a number of benefits over other resonant converter architectures. For example, LLC resonant converters offer high efficiency over a wide range on input voltages and loading conditions. Synchronous rectifiers are used on the secondary side of an LLC resonant converter to improve efficiency.

SUMMARY

A synchronous rectifier control circuit that reduces false turn-on of the synchronous rectifiers in a resonant DC/DC converter operating in burst mode is disclosed herein. In one example, a synchronous rectifier control circuit includes a drain voltage input, a first gate voltage output, a second gate voltage output, a gate voltage generation circuit, and a trigger control circuit. The gate voltage generation circuit includes a first input coupled to the drain voltage input, and an output coupled to the first gate voltage output. The trigger control circuit includes a first input coupled to the first gate voltage output, a second input coupled to the second gate voltage output, and an output coupled to a second input of the gate voltage generation circuit.

In another example, a synchronous rectifier control circuit includes a first control channel, a second control channel, and a trigger control circuit. The first control channel is configured to activate a first synchronous rectifier. The second control channel is configured to activate a second synchronous rectifier. The trigger control circuit is configured to activate a trigger control signal responsive to the first control channel activating the first synchronous rectifier, and to deactivate the trigger control signal responsive to the second control channel activating the second synchronous rectifier. The first control channel includes a gate voltage generation circuit configured to generate a gate control signal for the first synchronous rectifier based on the drain voltage of the first synchronous rectifier, and based on the trigger control signal generated by the trigger control circuit.

In a further example, a switch-mode power supply includes a transformer, a first synchronous rectifier, a second synchronous rectifier, and a synchronous rectifier control circuit. The first synchronous rectifier is coupled to a secondary winding of the transformer. The second synchronous rectifier is coupled to the secondary winding of the transformer. The synchronous rectifier control circuit is coupled to the first synchronous rectifier and the second synchronous rectifier. The synchronous rectifier control circuit includes a drain voltage input, a first gate voltage output, a second gate voltage output, a gate voltage generation circuit, and a trigger control circuit. The drain voltage input is coupled to a drain terminal of the first synchronous rectifier. The first gate voltage output is coupled to a gate terminal of the first synchronous rectifier. The second gate voltage output is coupled to a gate terminal of the second synchronous rectifier. The gate voltage generation circuit includes a first input coupled to the drain voltage input, and an output coupled to the first gate voltage output. The trigger control circuit includes a first input coupled to the first gate voltage output, a second input coupled to the second gate voltage output, and an output coupled to a second input of the gate voltage generation circuit.

BRIEF DESCRIPTION OF THE DRAWINGS

For a detailed description of various examples, reference will now be made to the accompanying drawings in which:

FIG. 3 shows a block diagram for an example synchronous rectifier control circuit suitable for use in a resonant DC/DC converter;

FIG. 5 shows a block diagram for an example trigger control circuit suitable for use in the synchronous rectifier control circuit of FIG. 3;

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Figure 1:
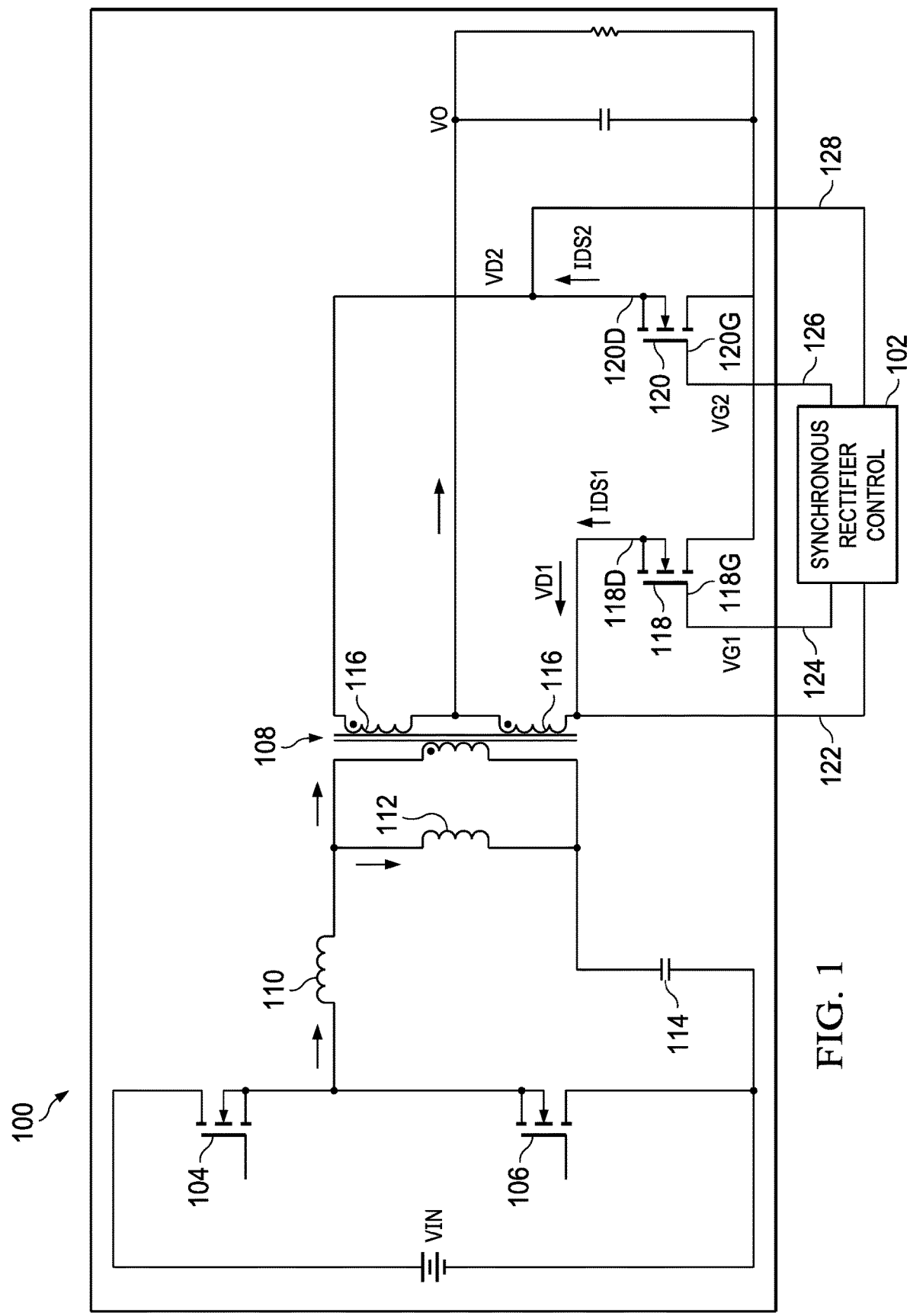
FIG. 1 shows a schematic diagram for an example LLC resonant converter in accordance with this description.

FIG. 1 shows a schematic diagram for an example LLC resonant converter 100 in accordance with this description. The LLC resonant converter 100 includes a high-side switching transistor 104, a low-side switching transistor 106, a transformer 108, an inductor 110, a capacitor 114, a synchronous rectifier 118, a synchronous rectifier 120, and a synchronous rectifier control circuit 102. The high-side switching transistor 104 and the low-side switching transistor 106 form a half-bridge, and the inductor 110, the capacitor 114, and the magnetizing inductance 112 of the transformer 108 form an LLC resonant circuit.

The synchronous rectifier 118 and the synchronous rectifier 120 are coupled to the secondary winding 116 of the transformer 108. The synchronous rectifier 118 and the synchronous rectifier 120 are coupled to, and controlled by the synchronous rectifier control circuit 102. The synchronous rectifier control circuit 102 monitors the drain voltage 122 at the drain terminal 118D of the synchronous rectifier 118, and responsive to the drain voltage 122 generates a gate voltage 124 that is provided to a gate terminal 118G of the synchronous rectifier 118. More specifically, the synchronous rectifier control circuit 102 turns on the synchronous rectifier 118 by detecting the forward biased body diode of the synchronous rectifier 118, and turns off the synchronous rectifier 118 by detecting that current in the synchronous rectifier 118 is near zero. Similarly, synchronous rectifier control circuit 102 monitors the drain voltage 128 of the synchronous rectifier 120, and responsive to the drain voltage 128 generates a gate voltage 126 that is provided to the synchronous rectifier 120.

In one example, when the drain voltage 122 falls below a predetermined turn-on threshold, the synchronous rectifier control circuit 102 generates a high (e.g., 10 volt) gate voltage 124 to turn on the synchronous rectifier 118, and holds the synchronous rectifier 118 on for at least a predetermined minimum on-time. After the minimum on-time expires, the synchronous rectifier control circuit 102 turns off the synchronous rectifier 118 by generating a low (e.g., 0 volt) gate voltage 124 based on drain voltage 122 rising above a predetermined turn-off threshold. The synchronous rectifier control circuit 102 controls the synchronous rectifier 120 in a similar fashion. The synchronous rectifier control circuit 102 may control the synchronous rectifier 118 and the synchronous rectifier 120 such that synchronous rectifier 118 and the synchronous rectifier 120 are turned on and off in a complementary manner. That is, the synchronous rectifier 118 is turned on when the synchronous rectifier 120 is off, and vice versa.

Figure 2:
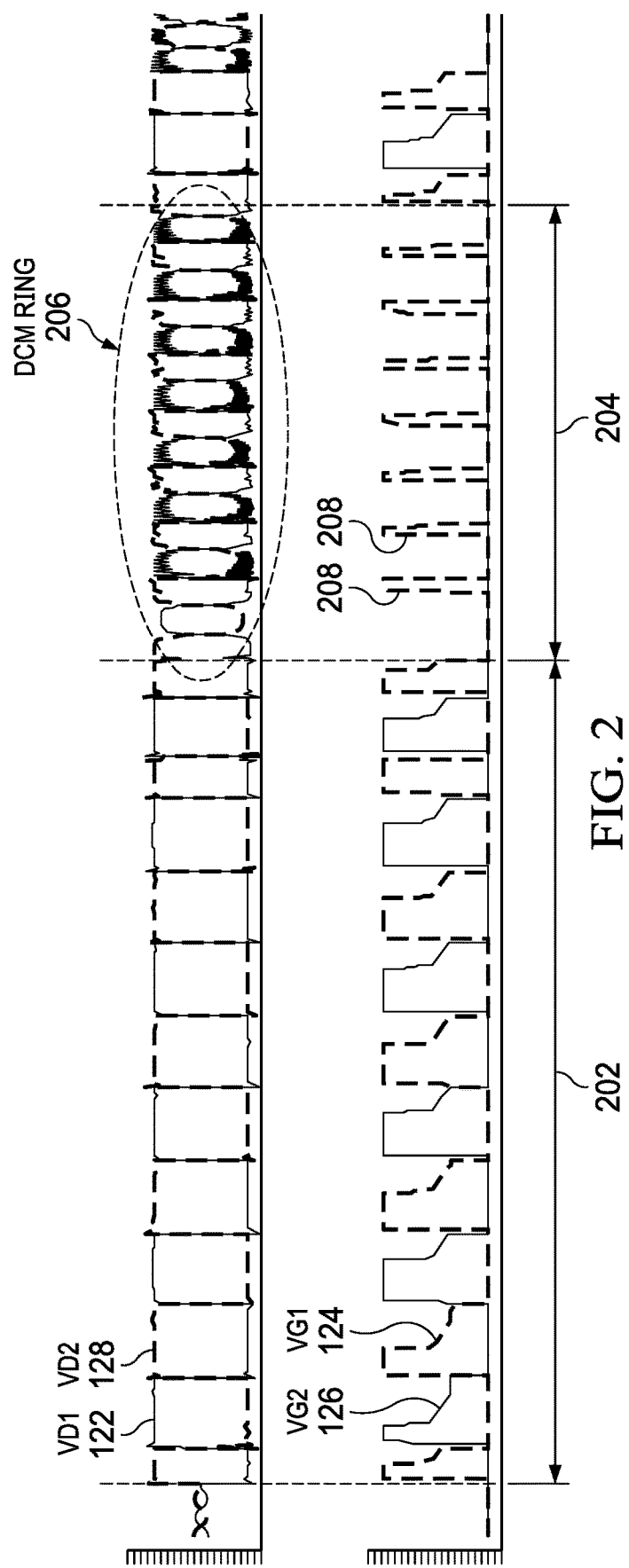
FIG. 2 shows signals generated by burst mode operation in an example of the LLC converter of FIG. 1.

Some implementations of the LLC resonant converter 100 operate in burst mode under light load conditions. In burst mode, the high-side switching transistor 104 and the low-side switching transistor 106 generate a series of pulses on the primary side of the transformer 108, and thereafter the high-side switching transistor 104 and the low-side switching transistor 106 may be turned off until the output voltage of the LLC resonant converter 100 falls below a predetermined threshold. FIG. 2 shows signals generated by burst mode operation of the LLC resonant converter 100. In interval 202, the high-side switching transistor 104 and the low-side switching transistor 106 are switching. The synchronous rectifier control circuit 102 detects the drain voltage 122 below an on-voltage threshold, and activates the gate voltage 124 to turn on the synchronous rectifier 118. Similarly, the synchronous rectifier control circuit 102 detects the drain voltage 128 below the on-voltage threshold, and activates the gate voltage 126 to turn on the synchronous rectifier 120.

In the interval 204, the high-side switching transistor 104 and the low-side switching transistor 106 are off, and the magnetizing inductance 112 of the transformer 108 resonates with the switch node capacitance to produce ringing. If the amplitude of the ringing exceeds the on-voltage threshold, then the synchronous rectifier control circuit 102 may turn on the synchronous rectifier 118 or the synchronous rectifier 120. In the interval 204, the ringing on the drain voltage 122 exceeds the on-voltage threshold, and once the synchronous rectifier control circuit 102 turns on the synchronous rectifier 118, there is sufficient energy in the tank to repeatedly cause the synchronous rectifier control circuit 102 to generate a gate voltage 124 that turns on the synchronous rectifier 118. This behavior increases loss in the LLC resonant converter 100 and increased electro-magnetic interference produced by the LLC resonant converter 100.

Some implementations of the synchronous rectifier control circuit 102 avoid turn on of the synchronous rectifiers responsive to the ringing in the interval 204 by providing a fixed long turn-on delay. While a fixed long turn-on delay suppresses activation of the synchronous rectifier 118 and the synchronous rectifier 120 in the interval 204, the fixed long turn-on delay would also delay the turn on of the synchronous rectifiers in the interval 202, which increases conduction loss in the synchronous rectifiers, and reduces the efficiency of the LLC resonant converter 100. Additionally, a fixed long turn-on delay in conjunction with the minimum turn-on time applied in the synchronous rectifier control circuit 102 limits the frequency range of the LLC resonant converter 100, which limits inductor size and increases the printed circuit board area needed to implement the LLC resonant converter 100.

Some implementations of the synchronous rectifier control circuit 102 include fixed off-time blanking (a fixed minimum off time) to inhibit false turn on of the synchronous rectifiers. However, the fixed off time limits the operating frequency of the synchronous rectifier control circuit 102 and may interfere with operation of the LLC resonant converter 100.

FIG. 3 shows a block diagram for an example synchronous rectifier control circuit 300 suitable for use in the LLC resonant converter 100. The synchronous rectifier control circuit 300 is an implementation of the synchronous rectifier control circuit 102. The synchronous rectifier control circuit 300 provides an adaptive turn-on delay that inhibits activation of the synchronous rectifier 118 and synchronous rectifier 120 due to ringing in burst mode without reducing the efficiency of the LLC resonant converter 100. The synchronous rectifier control circuit 300 includes a control channel 302 for activating the synchronous rectifier 118, a control channel 304 for activating the synchronous rectifier 120, and a trigger control circuit 310 coupled to the control channel 302 and the control channel 304. The control channel 302 includes a gate voltage generation circuit 306, and the control channel 304 includes a gate voltage generation circuit 308. The gate voltage generation circuit 308 may be identical to the gate voltage generation circuit 306 in some implementations of the synchronous rectifier control circuit 300.

The gate voltage generation circuit 306 includes a drain voltage input 306A coupled to the drain terminal 118D of the synchronous rectifier 118, an output 306C coupled to the gate terminal 118G of the synchronous rectifier 118, and an input 306B coupled to the output 3106 of the trigger control circuit 310. The gate voltage generation circuit 306 generates the gate voltage 124 based on the drain voltage 122 and the trigger control signal 312 received from the trigger control circuit 310. The gate voltage generation circuit 306 applies the trigger control signal 312 to inhibit activation of the gate voltage 124 during the interval 204.

The gate voltage generation circuit 308 includes a drain voltage input 308A coupled to the drain terminal 120D of the synchronous rectifier 120, an output 308C coupled to the gate terminal 120G of the synchronous rectifier 120, and an input 308B coupled to the output 310D of the trigger control circuit 310. The gate voltage generation circuit 308 generates the gate voltage 126 based on the drain voltage 128 and the trigger control signal 314 received from the trigger control circuit 310. The gate voltage generation circuit 308 applies the trigger control signal 314 to inhibit activation of the gate voltage 126 during the interval 204.

The trigger control circuit 310 includes an input 310A coupled to the output 306C of the gate voltage generation circuit 306, an input 310C coupled to the output 308C of the gate voltage generation circuit 308, an output 310B coupled to the input 306B of the gate voltage generation circuit 306, and an output 310D coupled to the input 308B of the gate voltage generation circuit 308. The trigger control circuit 310 generates the trigger control signal 312 and the trigger control signal 314 based on the gate voltage 124 and the gate voltage 126. The trigger control signal 312 and the trigger control signal 314 respectively inhibit activation of the gate voltage 124 and the gate voltage 126 during the interval 204.

Figure 4:
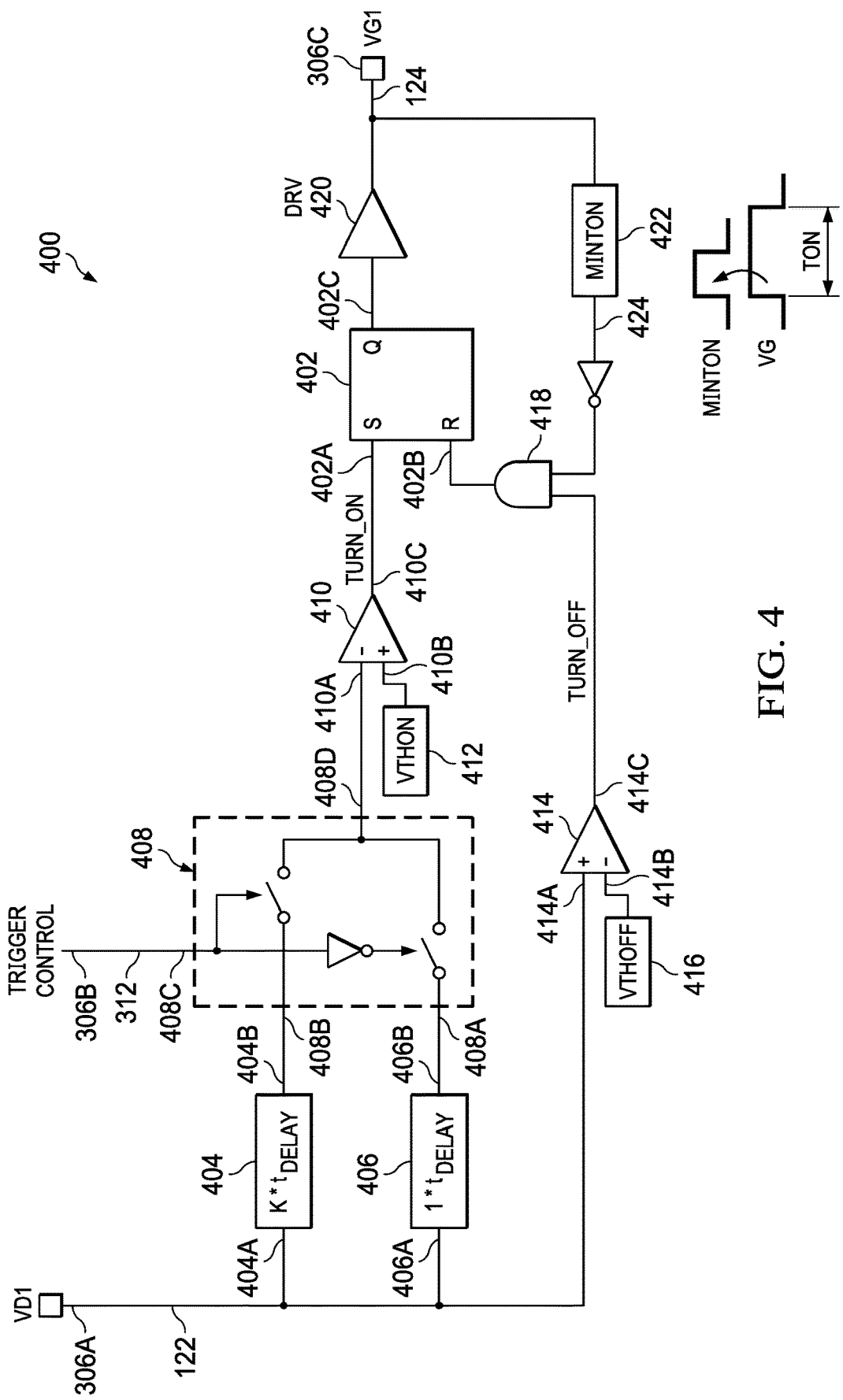
FIG. 4 shows a schematic diagram for an example gate voltage generation circuit suitable for use in the synchronous rectifier control circuit of FIG. 3.

FIG. 4 shows a schematic diagram for an example gate voltage generation circuit 400 suitable for use in the synchronous rectifier control circuit 300. The gate voltage generation circuit 400 is an implementation of the gate voltage generation circuit 306 or the gate voltage generation circuit 308. As a matter of convenience, the gate voltage generation circuit 400 is described herein as an implementation of the gate voltage generation circuit 306. The gate voltage generation circuit 400 includes a set-reset (SR) latch 402, a delay circuit 404, a delay circuit 406, a selector circuit 408, a comparator 410, an on-voltage threshold circuit 412, a comparator 414, an off-voltage threshold circuit 416, an AND gate 418, and a transistor driver circuit 420. The comparator 410 compares the two delayed versions of the drain voltage 122 to an on-threshold voltage to set the SR latch 402 and activate the gate voltage 124. The comparator 414 compares the drain voltage 122 to an off-threshold voltage to reset the SR latch 402 and deactivate the gate voltage 124.

The delay circuit 406 includes an input 406A coupled to the drain voltage input 306A, and an output 406B coupled to an input 408A of the selector circuit 408. The delay circuit 406 may be implemented as a number of serially connected buffers selected to provide a given time delay.

The delay circuit 404 includes an input 404A coupled to the drain voltage input 306A, and an output 404B coupled to an input 408B of the selector circuit 408. The delay circuit 404 may be implemented as a number of serially connected buffers selected to provide a given time delay. The time delay provided by the delay circuit 404 is relatively long with respect to the time delay provided by the delay circuit 406. For example, the delay circuit 404 may provide a time delay that is 2×, 3×, 4×, etc. that provided by the delay circuit 406. Generally, the time delay provided by the delay circuit 404 is sufficient to ensure that ringing in the interval 204 will not trigger activation of the gate voltage 124.

The selector circuit 408 includes an input 408A coupled to the output 406B of the delay circuit 406, an input 408B coupled to the output 404B of the delay circuit 404, an input 408C coupled to the output 310B of the trigger control circuit 310, and an output 408D coupled to an input 410A of the comparator 410. The selector circuit 408 routes the delayed drain voltage 122 received from the delay circuit 404 or the delayed drain voltage 122 received from the delay circuit 406 to the comparator 410. If the trigger control signal 312 is active, then the selector circuit 408 routes the delayed drain voltage 122 received from the delay circuit 404 to the comparator 410, and if the trigger control signal 312 is inactive, then the selector circuit 408 routes the delayed drain voltage 122 received from the delay circuit 406 to the comparator 410. By selecting the delay applied to set the SR latch 402 based on the trigger control signal 312, the gate voltage generation circuit 400 reduces the incidence of erroneous activation of the synchronous rectifier 118 without reducing the efficiency of the LLC resonant converter 100.

The comparator 410 includes an input 410A coupled to the output 408D of the selector circuit 408, an input 410B coupled to the on-voltage threshold circuit 412, and an output 410C coupled to an input 402A of the SR latch 402. The comparator 410 compares the delayed drain voltage 122 received from the selector circuit 408 to the on-threshold voltage received from the on-voltage threshold circuit 412. If the on-threshold voltage is greater than the delayed drain voltage 122, then the output signal of the comparator 410 is activated to set the SR latch 402.

The SR latch 402 includes an input 402A coupled to the output 410C of the comparator 410, an input 402B coupled to the AND gate 418, and an output 402C coupled to the transistor driver circuit 420. The SR latch 402 is set, to activate the gate voltage 124 if the output signal of the comparator 410 is active, and is reset, to deactivate the gate voltage 124 if the output signal of the AND gate 418 is active.

The transistor driver circuit 420 is coupled to the SR latch 402 and the output 306C. The transistor driver circuit 420 level shifts the output signal received from the SR latch 402 to meet the threshold voltage requirements of the synchronous rectifier 118.

The comparator 414 includes an input 414A coupled to the drain voltage input 306A, an input 414B coupled to the off-voltage threshold circuit 416, and an output 414C coupled to the AND gate 418. The comparator 414 compares the drain voltage 122 to the off-threshold voltage received from the off-voltage threshold circuit 416. If the drain voltage 122 is greater than the off-threshold voltage, the output signal of the comparator 414 is activated to reset the SR latch 402.

The AND gate 418 is coupled to the comparator 414 and to minimum on-time circuit 422. The AND gate 418 ensures that the SR latch 402 is not reset while the minimum on-time pulse 424 received from the minimum on-time circuit 422 is active. That is, the AND gate 418 ensures that the gate voltage 124 is active for at least the duration of the minimum on-time pulse 424.

The minimum on-time circuit 422 generates a minimum on-time pulse 424 for each activation of the gate voltage 124. The minimum on-time pulse 424 defines the minimum time that the gate voltage 124 remains active. For example, the 422 may be implemented as a pulse generator that generates a pulse having minimum on-time duration at a leading edge of each pulse of the gate voltage 124.

FIG. 5 shows a block diagram for an example trigger control circuit 500. The trigger control circuit 500 is an implementation of the trigger control circuit 310. The trigger control circuit 500 includes a SR latch 502. The SR latch 502 includes an input 502A coupled to the output 306C of the gate voltage generation circuit 306, and an input 502B coupled to the output 308C of the gate voltage generation circuit 308. When the gate voltage generation circuit 306 activates the gate voltage 124, the SR latch 502 is set and the trigger control signal 312 is activated. As explained with regard to the gate voltage generation circuit 400, when the trigger control signal 312 is active the delayed drain voltage 122 provided by the delay circuit 404 is routed to the SR latch 402. That is, a longer turn-on delay is selected to inhibit activation of the gate voltage 124. When the gate voltage generation circuit 308 activates the gate voltage 126, the SR latch 502 is reset and the trigger control signal 312 is deactivated. When the trigger control signal 312 is inactive, the delayed drain voltage 122 provided by the delay circuit 406 is routed to the SR latch 402. That is, a shorter turn-on delay is selected to improve the efficiency of the LLC resonant converter 100 during the interval 202.

The complementary output 502D of the SR latch 502 may provide the trigger control signal 314 in some implementations of the trigger control circuit 310. Some implementations of the trigger control circuit 310 may include separate instances of the trigger control circuit 500 for generating the trigger control signal 312 and the trigger control signal 314.

Figure 6:
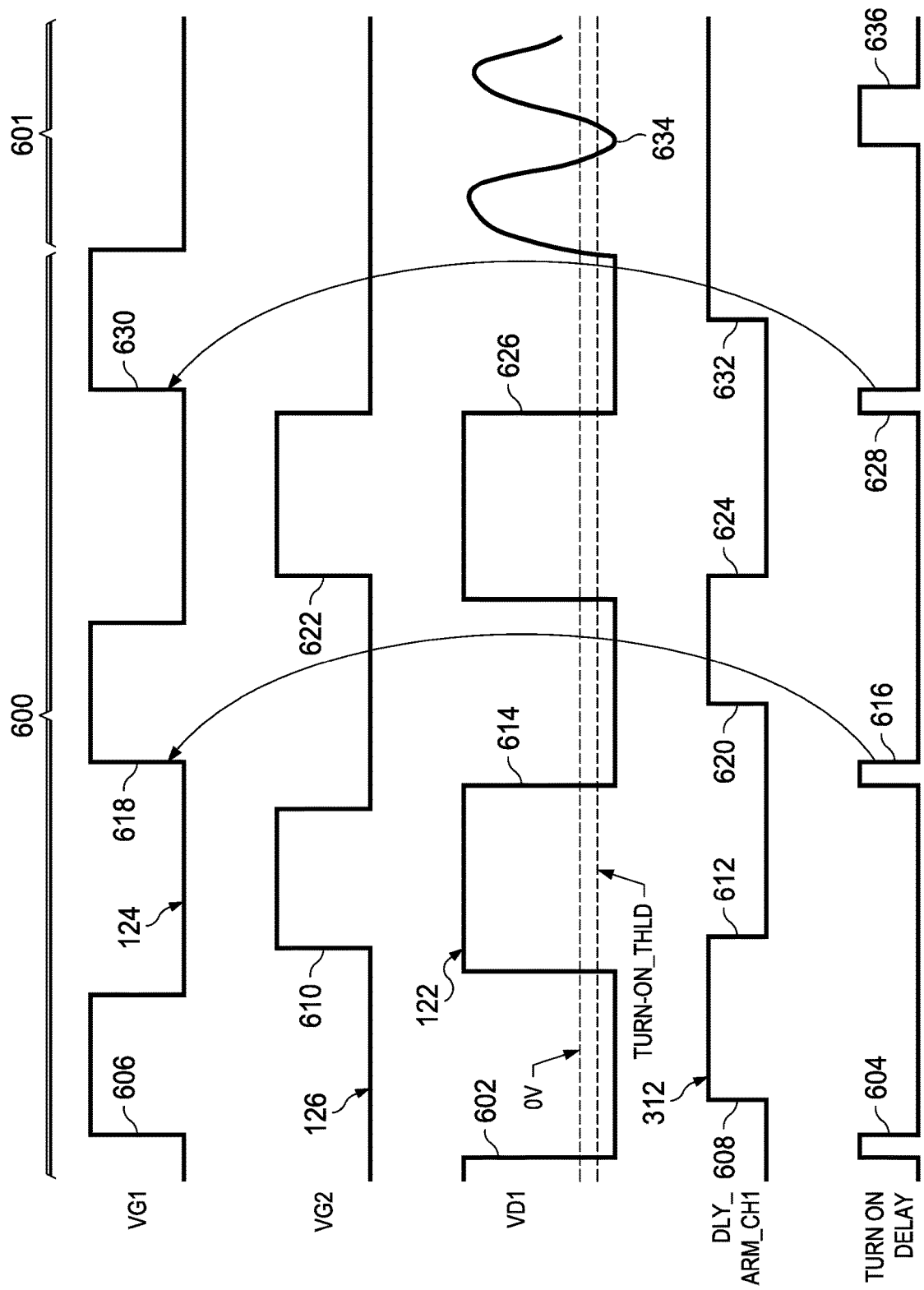
FIG. 6 shows an example of signals generated by operation of an LLC resonant converter using the synchronous rectifier control circuit of FIG. 3 with the gate voltage generation circuit of FIG. 4.

FIG. 6 shows an example of signals generated by operation of the LLC resonant converter 100 using an implementation of the synchronous rectifier control circuit 300 that includes the gate voltage generation circuit 400. In FIG. 6, the LLC resonant converter 100 is operating in burst mode, and in interval 600, the high-side switching transistor 104 and the low-side switching transistor 106 are switching.

At 602, the drain voltage 122 falls below the turn-on threshold voltage. The short turn-on delay provided by the delay circuit 406 expires at 604, and the gate voltage 124 is activated at 606. Responsive to activation of the gate voltage 124, the trigger control signal 312 is activated at 608, thereby selecting the longer delay provided by the delay circuit 404 in the gate voltage generation circuit 306. At 610, the gate voltage generation circuit 308 activates the gate voltage 126 to turn on the synchronous rectifier 120. Activation of the gate voltage 126 resets the trigger control signal 312, thereby selecting the shorter delay provided by the delay circuit 406 in the gate voltage generation circuit 306. Had the gate voltage 126 not been activated, the longer delay of the delay circuit 404 would have remained in place.

At 614, the drain voltage 122 falls below the turn-on threshold voltage. The short turn-on delay provided by the delay circuit 406 expires at 616, and the gate voltage 124 is activated at 618. The turn-on delay of FIG. 6 represents the time that the drain voltage 122 is delayed in the delay circuit 404 or the delay circuit 406. At 614, the delay circuit 406 is selected by selector circuit 408, and at 616 the excursion of the drain voltage below the turn-on threshold voltage at 614 has propagated through the delay circuit 406 to the comparator 410. The comparator 410 changes state at 618 to set the SR latch 402 and activate the gate voltage 124. Responsive to activation of the gate voltage 124, the trigger control signal 312 is activated at 620, thereby selecting the longer delay provided by the delay circuit 404 in the gate voltage generation circuit 306. At 622, the gate voltage generation circuit 308 activates the gate voltage 126 to turn on the synchronous rectifier 120. Activation of the gate voltage 126 resets the trigger control signal 312, thereby selecting the shorter delay provided by the delay circuit 406 in the gate voltage generation circuit 306. Had the gate voltage 126 not been activated, the longer delay of the delay circuit 404 would have remained in place.

At 626, the drain voltage 122 falls below the turn-on threshold voltage. The short turn-on delay provided by the delay circuit 406 expires at 628, and the gate voltage 124 is activated at 630. As explained above, the turn-on delay of FIG. 6 represents the time that the drain voltage 122 is delayed in the delay circuit 404 or the delay circuit 406. At 626, the delay circuit 406 is selected by selector circuit 408, and at 628 the excursion of the drain voltage below the turn-on threshold voltage at 626 has propagated through the delay circuit 406 to the comparator 410. The comparator 410 changes state at 630 to set the SR latch 402 and activate the gate voltage 124. Responsive to activation of the gate voltage 124, the trigger control signal 312 is activated at 632, thereby selecting the longer delay provided by the delay circuit 404 in the gate voltage generation circuit 306.

In the interval 601, the high-side switching transistor 104 and the low-side switching transistor 106 are off, and the drain voltage 122 is ringing. At 634 the ringing falls below the turn-on threshold voltage. Because the gate voltage 126 was not activated after activation of the trigger control signal 312 at 632, the longer delay provided by the delay circuit 404 is selected in the gate voltage generation circuit 306. At expiration 636 of the longer delay, the drain voltage 122 is greater than the turn-on threshold voltage, the gate voltage generation circuit 306 does not activate the gate voltage 124, and the synchronous rectifier 118 is not turned on.

Figure 7:
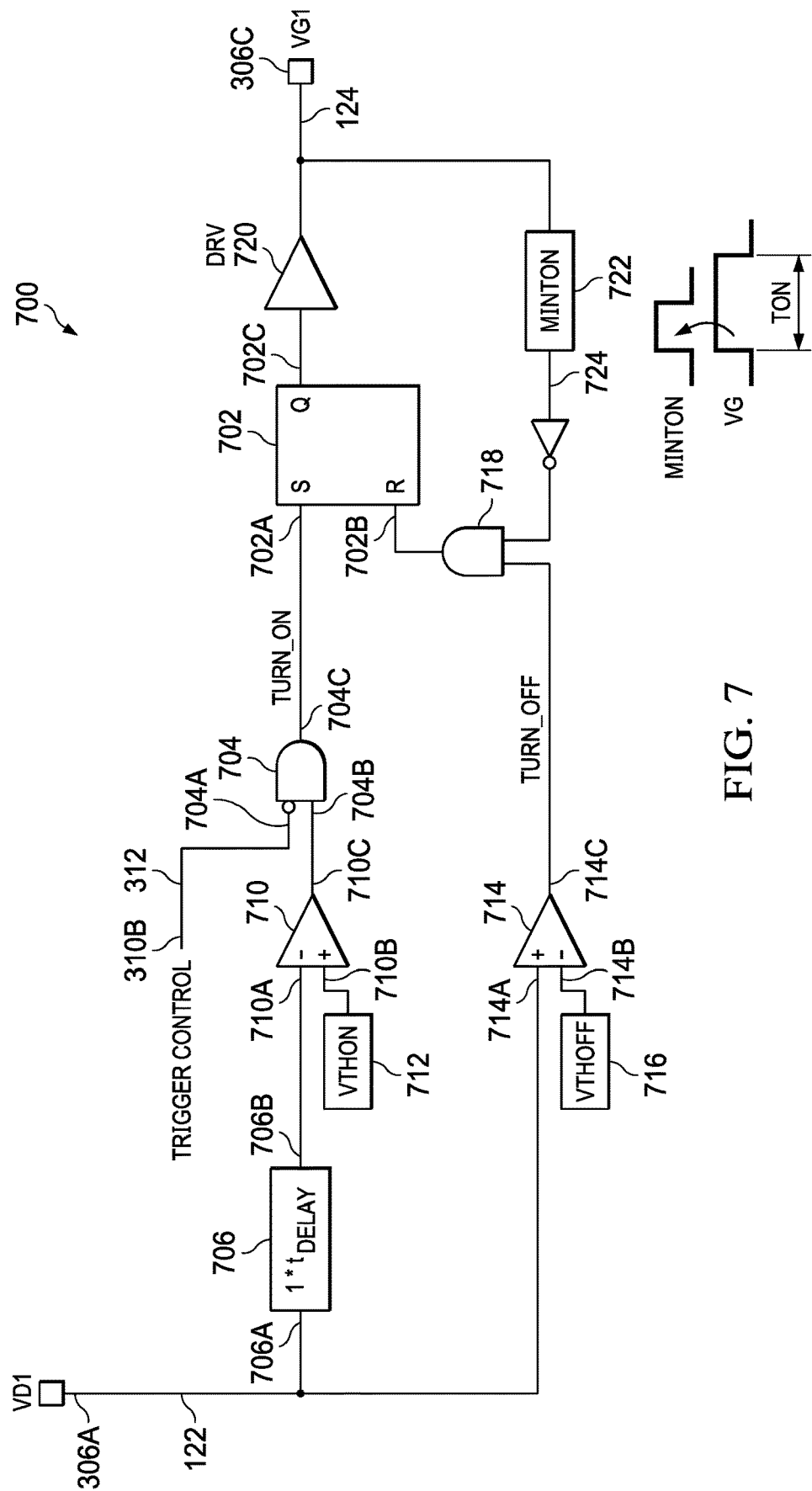
FIG. 7 shows a schematic diagram for another example gate voltage generation circuit suitable for use in the synchronous rectifier control circuit of FIG. 3.

FIG. 7 shows a schematic diagram for another example gate voltage generation circuit 700 suitable for use in the synchronous rectifier control circuit 300. The gate voltage generation circuit 700 is an implementation of the gate voltage generation circuit 306 or the gate voltage generation circuit 308. As a matter of convenience, the gate voltage generation circuit 700 is described as an implementation of the gate voltage generation circuit 306. The gate voltage generation circuit 700 includes an SR latch 702, an AND gate 704, a delay circuit 706, a comparator 710, an on-voltage threshold circuit 712, a comparator 714, an off-voltage threshold circuit 716, an AND gate 718, and a transistor driver circuit 720. The comparator 710 compares a delayed version of the drain voltage 122 to an on-threshold voltage to set the SR latch 702 and activate the gate voltage 124. The comparator 714 compares the drain voltage 122 to an off-threshold voltage to reset the SR latch 702 and deactivate the gate voltage 124.

The delay circuit 706 includes an input 706A coupled to the drain voltage input 306A, and an output 706B coupled to an input 710A of the comparator 710. The delay circuit 706 may be implemented as a number of serially connected buffers selected to provide a given time delay.

The comparator 710 includes an input 710A coupled to the output 706B of the delay circuit 706, an input 710B coupled to the on-voltage threshold circuit 712, and an output 710C coupled to an input 704B of the AND gate 704. The comparator 710 compares the delayed drain voltage 122 received from the delay circuit 706 to the on-threshold voltage received from the on-voltage threshold circuit 712. If the on-threshold voltage is greater than the delayed drain voltage 122, the output signal of the comparator 710 is activated to set the SR latch 702.

The AND gate 704 includes an input 704A coupled to the output 310B of the trigger control circuit 310, an input 704B coupled to the output 710C, and an output 704C coupled to the input 702A of the SR latch 702. The AND gate 704 passes the output signal generated by the comparator 710 to the SR latch 702 only when the trigger control signal 312 is inactive. Thus, the AND gate 704 acts as a variable delay that inhibits activation of the gate voltage 124 until the trigger control signal 312 has be deactivated by generation of a pulse on the gate voltage 126.

The SR latch 702 includes an input 702A coupled to the output 704C of the AND gate 704, an input 702B coupled to the AND gate 718, and an output 702C coupled to the transistor driver circuit 720. The SR latch 702 is set, to activate the gate voltage 124 if the output signal of the AND gate 704 is active, and is reset, to deactivate the gate voltage 124 if the output signal of the AND gate 718 is active.

The transistor driver circuit 720 is coupled to the SR latch 702 and the output 306C. The transistor driver circuit 720 level shifts the output signal received from the SR latch 702 to meet the threshold voltage requirements of the synchronous rectifier 118.

The comparator 714 includes an input 714A coupled to the drain voltage input 306A, an input 714B coupled to the off-voltage threshold circuit 716, and an output 714C coupled to the AND gate 718. The comparator 714 compares the drain voltage 122 to the off-threshold voltage received from the off-voltage threshold circuit 716. If the drain voltage 122 is greater than the off-threshold voltage, the output signal of the comparator 714 is activated to reset the SR latch 702.

The AND gate 718 is coupled to the comparator 714 and minimum on-time circuit 722. The AND gate 718 ensures that the SR latch 702 is not reset while the minimum on-time pulse 724 received from the minimum on-time circuit 722 is active. That is, the AND gate 718 ensures that the gate voltage 124 is active for at least the duration of the minimum on-time pulse 724.

The minimum on-time circuit 722 generates a minimum on-time pulse 724 for each activation of the gate voltage 124. The minimum on-time pulse 724 defines the minimum time that the gate voltage 124 remains active. For example, the 722 may be implemented as a pulse generator that generates a pulse having minimum on-time duration at a leading edge of each pulse of the gate voltage 124.

Figure 8:
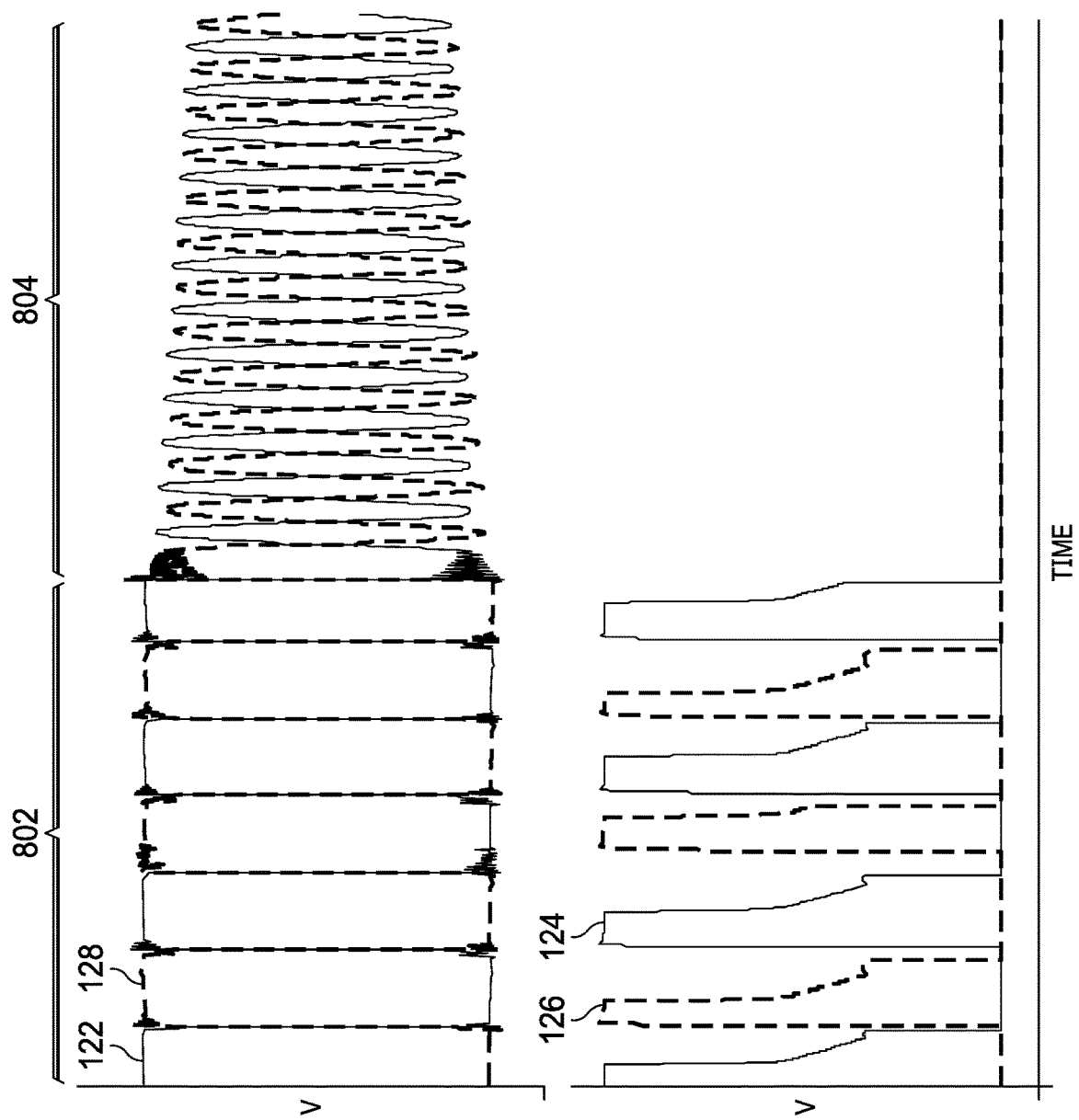
FIG. 8 shows an example of signals generated by operation of the LLC resonant converter of FIG. 1 using the synchronous rectifier control circuit of FIG. 3.

FIG. 8 shows an example of signals generated by operation of the LLC resonant converter 100 using the synchronous rectifier control circuit 300. In FIG. 8, the LLC resonant converter 100 is operating in burst mode, and in interval 802, the high-side switching transistor 104 and the low-side switching transistor 106 are switching. The synchronous rectifier control circuit 300 is monitoring the drain voltage 122 and drain voltage 128 and activating the gate voltage 124 and gate voltage 126 responsive to the drain voltage 122 or the drain voltage 128 falling below a turn-on voltage threshold. In the gate voltage generation circuit 306 and the gate voltage generation circuit 308, short turn-on delays are applied to improve the efficiency of the LLC resonant converter 100.

In the interval 804, the high-side switching transistor 104 and the low-side switching transistor 106 are off, and the drain voltage 122 and the drain voltage 128 are ringing. In the gate voltage generation circuit 306 and the gate voltage generation circuit 308, long turn-on delays are applied to inhibit activation of the gate voltage 124 and the gate voltage 126, thereby reducing noise and loss in the LLC resonant converter 100.

Figure 9:
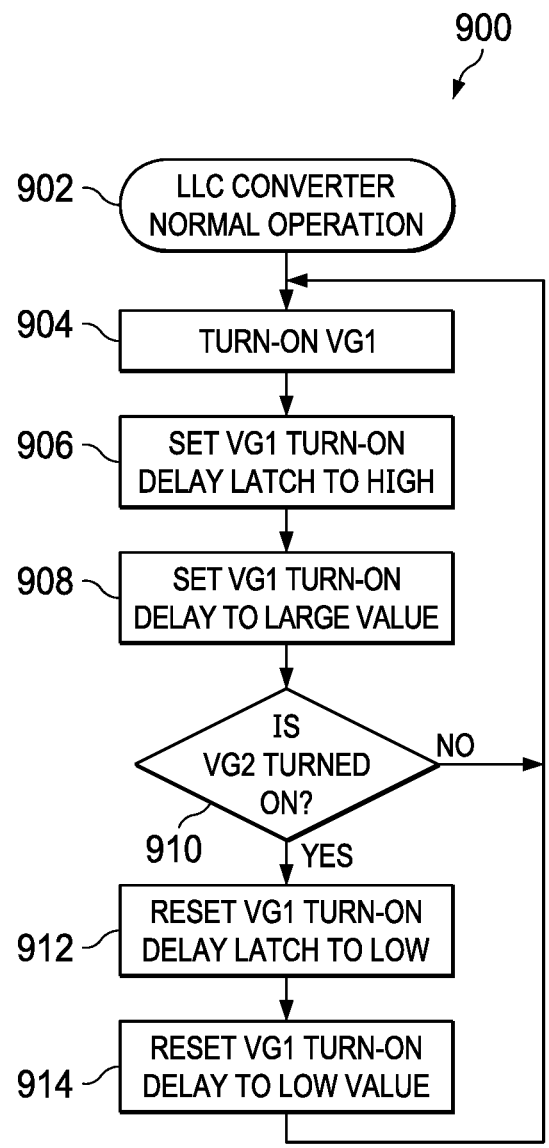
FIG. 9 shows a flow diagram for an example method for controlling a synchronous rectifier in a resonant converter.

FIG. 9 shows a flow diagram for an example method 900 for controlling a synchronous rectifier in a resonant converter. Though depicted sequentially as a matter of convenience, at least some of the actions shown can be performed in a different order and/or performed in parallel. Additionally, some implementations may perform only some of the actions shown. The operations of the method 900 may be performed by an implementation of the LLC resonant converter 100 that includes the synchronous rectifier control circuit 300.

In block 902, the LLC resonant converter 100 is operating. Operation of the LLC resonant converter 100 includes burst mode operation and non-burst mode operation.

In block 904, the synchronous rectifier control circuit 300 activates the gate voltage 124 to turn on the synchronous rectifier 118.

In block 906, responsive to activation of the gate voltage 124, the SR latch 502 is set to activate the trigger control signal 312.

In block 908, the active trigger control signal 312 causes the selector circuit 408 to select the long turn-on delay generated by the delay circuit 404.

In block 910, if the gate voltage 126 is inactive, the SR latch 502 remains set. However, if the gate voltage 126 is active, then the SR latch 502 is reset, in block 912, to deactivate the trigger control signal 312.

In block 914, the inactive trigger control signal 312 causes the selector circuit 408 to select the short turn-on delay generated by the delay circuit 406.

Thus, the gate voltage generation circuits 400 and 700 in conjunction with the trigger control circuit 500 provide an adaptive delay time, in which the turn-on delay time is relatively short (by selection of the delay circuit 406) to improve efficiency when the gate voltage generation circuit 306 and the gate voltage generation circuit 308 alternately trigger the synchronous rectifiers 118 and 120. In contrast, the turn-on delay time is longer (by selection of the delay circuit 406) or turn-on is disabled (by the AND gate 704) when the gate voltage generation circuit 306 and the gate voltage generation circuit 308 do not alternately trigger the synchronous rectifiers 118 and 120 to prevent false triggering during, for example, discontinuous mode ringing. Moreover, the adaptive delays allow off-time blanking to be eliminated in some synchronous rectifier control circuits, which simplifies design and implementation.

Systems that include power supplies, such as the LLC resonant converter 100 implemented using the synchronous rectifier control circuit 300 may provide higher efficiency than other power supplies. For example, the higher efficiency of the synchronous rectifiers provided by the synchronous rectifier control circuit 300 may result in longer operational life of a battery powered system, or allow use of smaller batteries without reducing operation life.

Modifications are possible in the described embodiments, and other embodiments are possible, within the scope of the claims.

What is claimed is:

1. A synchronous rectifier control circuit, comprising:
 a drain voltage input;
 a first gate voltage output;
 a second gate voltage output;
 a gate voltage generation circuit comprising:
  a set-reset (SR) latch comprising an output coupled to the first gate voltage output;
  a first delay circuit comprising an input coupled to the drain voltage input;
  a second delay circuit comprising an input coupled to the drain voltage input;
  a selector circuit comprising:
   a first input coupled to an output of the first delay circuit;
   a second input coupled to an output of the second delay circuit;
   a third input; and
   an output coupled to the input of the SR latch; and
 a trigger control circuit comprising:
  a first input coupled to the first gate voltage output;
  a second input coupled to the second gate voltage output; and
  an output coupled to the third input of the selector circuit.

2. The synchronous rectifier control circuit of claim 1, wherein a delay provided by the second delay circuit is longer than a delay provided the first delay circuit.

3. The synchronous rectifier control circuit of claim 1, wherein the trigger control circuit comprises an SR latch comprising:
   a first input coupled to the first gate voltage output;
   a second input coupled to the second gate voltage output; and
   an output coupled to the third input of the selector circuit.

4. The synchronous rectifier control circuit of claim 1, wherein:
   the drain voltage input is a first drain voltage input;
   the gate voltage generation circuit is a first gate voltage generation circuit;
   the output of the trigger control circuit is a first output; and
   the synchronous rectifier control circuit further comprises:
      a second drain voltage input; and
      a second gate voltage generation circuit comprising:
         a first input coupled to the second drain voltage input;
         a second input coupled to a second output of the trigger control circuit; and
         an output coupled to the second gate voltage output.

5. The synchronous rectifier control circuit of claim 4, wherein signal provided at the second output of the trigger control circuit is complementary to signal provided at the first output of the trigger control circuit.

6. The synchronous rectifier control circuit of claim 1, wherein:
   the drain voltage input is a first drain voltage input;
   the gate voltage generation circuit is a first gate voltage generation circuit;
   the trigger control circuit is a first trigger control circuit; and
   the synchronous rectifier control circuit further comprises:
      a second drain voltage input;
      a second gate voltage generation circuit comprising:
         a first input coupled to the second drain voltage input; and
         an output coupled to the second gate voltage output; and
      a second trigger control circuit comprising:
         a first input coupled to the second gate voltage output;
         a second input coupled to the first gate voltage output; and
         an output coupled to a second input of the second gate voltage generation circuit.

7. A synchronous rectifier control circuit, comprising:
   a drain voltage input;
   a first gate voltage output;
   a second gate voltage output;
   a gate voltage generation circuit comprising:
      a first input coupled to the drain voltage input;
      a set-reset (SR) latch comprising a first input, a second input and an output coupled to the first gate voltage output;
      an AND gate comprising:
         an output coupled to the first input of the SR latch; and
         a first input;
      a comparator comprising:
         an output coupled to a second input of the AND gate; and
         a first input coupled to a threshold voltage circuit;
      a delay circuit comprising:
         an input coupled to the drain voltage input; and
         an output coupled to a second input of the comparator; and
   a trigger control circuit comprising:
      a first input coupled to the first gate voltage output;
      a second input coupled to the second gate voltage output; and
      an output coupled to the first input of the AND gate.

8. A synchronous rectifier control circuit, comprising:
   a first control channel configured to activate a first synchronous rectifier;
   a second control channel configured to activate a second synchronous rectifier; and
   a trigger control circuit configured to:
      activate a trigger control signal responsive to the first control channel activating the first synchronous rectifier; and
      deactivate the trigger control signal responsive to the second control channel activating the second synchronous rectifier; and
   wherein the first control channel comprises a gate voltage generation circuit configured to:
      generate a gate control signal for the first synchronous rectifier based on a drain voltage of the first synchronous rectifier, and the trigger control signal generated by the trigger control circuit;
      apply a first delay to generate the gate control signal based on the trigger control signal being active; and
      apply a second delay to generate the gate control signal based on the trigger control signal being inactive;
      wherein the first delay is longer than the second delay.

9. The synchronous rectifier control circuit of claim 8, wherein the gate voltage generation circuit is configured to:
   enable generation of the gate control signal based on the trigger control signal being inactive; and
   disable generation of the gate control signal based on the trigger control signal being active.

10. The synchronous rectifier control circuit of claim 8, wherein the second control channel comprises a gate voltage generation circuit configured to generate a gate control signal for the second synchronous rectifier based on a drain voltage of the second synchronous rectifier.

11. The synchronous rectifier control circuit of claim 10, wherein the gate voltage generation circuit of the second control channel is configured to generate the gate control signal for the second synchronous rectifier based on the trigger control signal.

12. The synchronous rectifier control circuit of claim 10, wherein:
   the trigger control circuit is a first trigger control circuit;
   the trigger control signal is a first trigger control signal; and
   the synchronous rectifier control circuit comprises a second trigger control circuit configured to:
      activate a second trigger control signal responsive to the second control channel activating the second synchronous rectifier; and
      deactivate the second trigger control signal responsive to the first control channel activating the first synchronous rectifier; and
   the gate voltage generation circuit of the second control channel is configured to generate the gate control signal for the second synchronous rectifier based on the second trigger control signal.

13. A switch-mode power supply having a transformer with a primary winding and a secondary winding, comprising:
   a first synchronous rectifier operable to be coupled to the secondary winding of the transformer;
   a second synchronous rectifier operable to be coupled to the secondary winding of the transformer;
   a synchronous rectifier control circuit coupled to the first synchronous rectifier and the second synchronous rectifier, and comprising:
      a drain voltage input coupled to a drain terminal of the first synchronous rectifier;
      a first gate voltage output coupled to a gate terminal of the first synchronous rectifier;
      a second gate voltage output coupled to a gate terminal of the second synchronous rectifier;
      a gate voltage generation circuit comprising:
         an SR latch comprising an output coupled to the first gate voltage output;
         an AND gate comprising:
            an output coupled to a first input of the SR latch; and
            a first input;
         a comparator comprising:
            an output coupled to a second input of the AND gate; and
            a first input coupled to a threshold voltage circuit;
         a delay circuit comprising:
            an input coupled to the drain voltage input; and
            an output coupled to a second input of the comparator; and
      a trigger control circuit comprising:
         a first input coupled to the first gate voltage output;
         a second input coupled to the second gate voltage output; and
         an output coupled to the first input of the AND gate.

14. The switch-mode power supply of claim 13, wherein the gate voltage generation circuit comprises:
   a set-reset (SR) latch comprising an output coupled to the first gate voltage output;
   a first delay circuit comprising an input coupled to the drain voltage input;
   a second delay circuit comprising an input coupled to the drain voltage input; and
   a selector circuit comprising:
      a first input coupled to an output of the first delay circuit;
      a second input coupled to an output of the second delay circuit;
      a third input coupled to the output of the trigger control circuit; and
      an output coupled to an input of the SR latch.

15. The switch-mode power supply of claim 14, wherein a delay provided by the second delay circuit is longer than a delay provided the first delay circuit.

16. The switch-mode power supply of claim 14, wherein the trigger control circuit comprises an SR latch comprising:
   a first input coupled to the first gate voltage output;
   a second input coupled to the second gate voltage output; and
   an output coupled to the third input of the selector circuit.

17. The synchronous rectifier control circuit of claim 13, wherein:
   the drain voltage input is a first drain voltage input;
   the gate voltage generation circuit is a first gate voltage generation circuit;
   the output of the trigger control circuit is a first output;
   the synchronous rectifier control circuit further comprises:
      a second drain voltage input;
      a second gate voltage generation circuit comprising:
         a first input coupled to the second drain voltage input;
         a second input coupled to a second output of the trigger control circuit; and
         an output coupled to the second gate voltage output; and
   signal provided at the second output of the trigger control circuit is complementary to signal provided at the first output of the trigger control circuit.

* * * * *